Dec. 12, 1950  J. L. RAWLINGS  2,533,896
BALL RELEASE MECHANISM FOR MEASURING INSTRUMENTS
Filed Nov. 26, 1948

INVENTOR.
JOHN L. RAWLINGS
BY
Campbell, Brumbaugh, Free & Graves
HIS ATTORNEYS.

Patented Dec. 12, 1950

2,533,896

UNITED STATES PATENT OFFICE 2,533,896

BALL RELEASE MECHANISM FOR MEASURING INSTRUMENTS

John Lionel Rawlings, Elmont, N. Y., assignor to Kollmorgen Optical Corporation, Brooklyn, N. Y., a corporation of New York Application November 26, 1948, Serial No. 62,095

10 Claims. (Cl. 33—206)

1

This invention relates to ball releasing or dropping mechanisms for determining the true horizontal or vertical position of an observation instrument, such as a sextant or the like, while making an observation.

Various types of ball dropping or releasing mechanisms have been extensively employed in sextants and other measuring instruments. One of the earlier forms of ball release mechanisms included several retainers resembling the jaws of a chuck in which the ball was held preparatory to releasing it. The jaws were retracted to permit the ball to fall. With this type of mechanisms, the flight of the ball was erratic even when the release mechanism was not tilted, due to the fact that the ball had a tendency to roll off one of the other of the jaws as it was being released.

An improved form of ball release mechanism was devised in which the ball is pressed upwardly by a spring against three points lying in a horizontal plane. In order to release the ball, the spring was swung downwardly out of the path of the ball with an acceleration greater than the acceleration due to gravity at the moment of release. This device suffers from the disadvantage that up to the instant of release, the three locating points exert forces which have horizontal components. If these forces are not perfectly balanced or if they are not released simultaneously, a horizontal component will appear in the flight of the ball.

Other forms of ball release mechanisms including electromagnets having cup-shaped recesses therein for receiving the ball have also been devised but these ball release mechanisms, like the ones described above, are only really accurate when the magnet is disposed with its axis in a truly vertical position, as otherwise, the ball tends to be displaced off one edge or the other of the cup-shaped retaining recess, thereby imparting a horizontal component to its flight during fall.

An object of the present invention is to provide a means for releasing a spherical body, such as a steel ball, in space in such a manner as to relieve it of all horizontal components of force which would tend to throw the ball out of vertical flight.

Another object of the invention is to provide a ball release mechanism which reduces to a minimum the initial velocity of the ball in any direction for the purpose of permitting a truly vertical flight.

Other objects of the invention will become apparent from the following description of a typical form of ball release mechanism embodying the present invention.

In accordance with the invention, a retaining and releasing mechanism is provided in which the ball is held under substantial pressure between two substantially parallel flat anvil members until the ball is ready for release.

In order to reduce the possibility of displacement of the ball by shock or vibration, a relatively large clamping force is necessary. However, such clamping force will produce a correspondingly great deformation of the ball and the clamping anvils so that should the lower anvil be suddenly removed, the elastic energy stored in the ball and in the upper anvil will impart to the ball an acceleration in a direction perpendicular to the face of the upper anvil. Inasmuch as the anvil face will not necessarily be horizontal due to a tilted position of the instrument, the ball would be thrown outwardly with a horizontal component in its flight.

This objection is overcome, in the present invention, by removing the clamping force immediately prior to the release of the ball, but over a time interval sufficient to allow the elastic energy of the ball and the upper anvil to be expended, before the ball is released completely. The clamping force remaining is just sufficient to overcome the weight of the ball; in other words, the clamping pressure at this instant is virtually zero. Release of the ball by moving the lower anvil away from it at an acceleration greater than the acceleration due to gravity will then permit the ball to fall freely from the face of the upper anvil with no horizontal component imparted to the ball even though the mechanism may be tilted substantially from the horizontal. In this way, the ball falls freely in a vertical line so that its point of impact will provide an accurate indication of true horizontal and vertical.

For a better understanding of the present invention, reference may be had to the accompanying drawings, in which.

Figure 2:
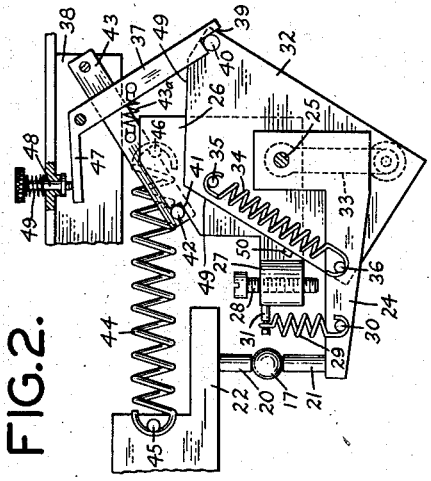
Fig. 2 is a front view of the ball release mechanism with the casing therefor shown only partially and with the ball in tightly clamped position.

The invention will be described generally in relation to its application to an inclinometer and sextant which is illustrated only schematically in the drawings for the reason that such devices are well-known and do not form a part of the present invention. It will be understood that the ball release mechanism described hereinafter may be used with any type of instrument requiring a ball release mechanism.

Figure 1:
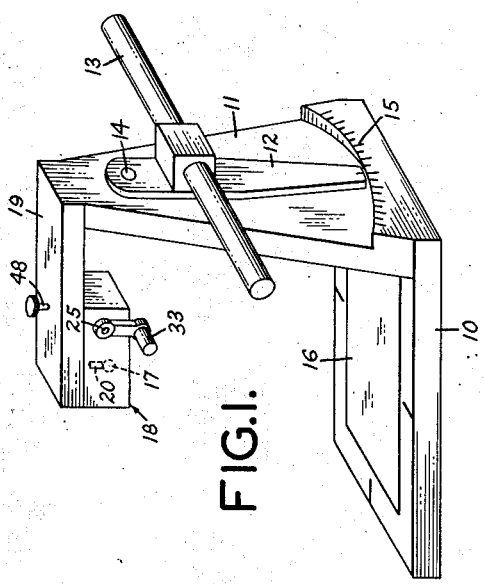
Fig. 1 is a perspective view of a schematic form of observation instrument such as an inclinometer and sextant illustrating the arrangement of the ball release mechanism thereon.

The inclinometer and sextant disclosed in Fig. 1 includes a platform or base 10, from which extends vertically a limb 11 upon which the sextant arm 12 and telescope 13 are mounted by means of a pivot 14 which is concentric with the arc 15 or elevation scale with which the arm 12 cooperates. The base 10 may be provided with a sheet of waxed paper 16 upon which a mark or dent is made by the release of the ball 17 from the ball release mechanism 18.

The ball release mechanism 18, as illustrated, is supported by an arm 19 which extends outwardly over the base from the upper end of the sextant limb 11.

It will be understood that the position of the impression, dent or mark made by the ball on the waxed paper or other indicating medium indicates the inclination of the sextant with respect to the horizontal and the vertical in the usual way.

It will also be understood that the waxed paper may be advanced by means of spools and reels to obtain different readings and that other elements than waxed paper may be used to indicate the point of impact of the ball 17.

Figure 4:
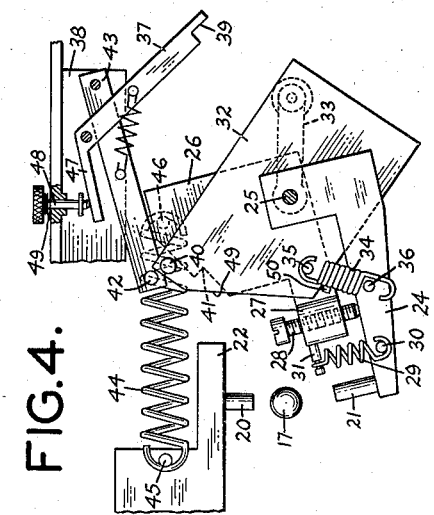
Fig. 4 is a front view of the mechanism partly in section and partly broken away illustrating the position of the parts at the moment of release of the ball.
Figure 3:
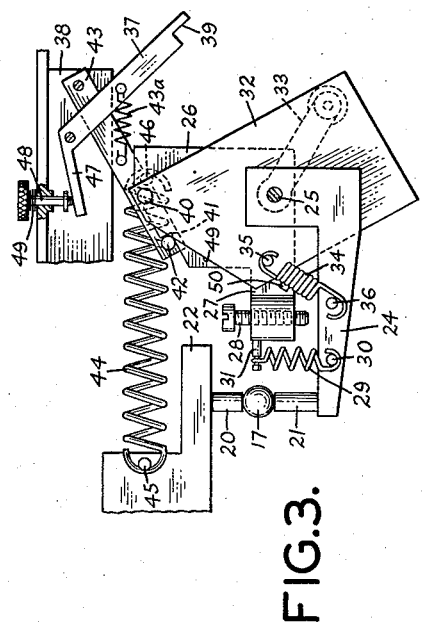
Fig. 3 is a front view of the release mechanism with the clamping pressure partially removed, the device being shown partly in section and partly broken away.

Referring now to Figs. 2, 3 and 4, the ball release mechanism embodying the present invention includes an upper anvil member 20 and a lower anvil member 21 between which the ball 17 is clamped before it is released for free fall. Both of the anvils have substantially horizontally parallel opposing faces for engaging the ball 17. The upper anvil 20 is supported on a rigid arm 22 which may be fixed to the end of the box or housing 23 for the ball release mechanism.

The ball may be inserted between the anvil members 20 and 21 in any desired way, such as for example, by means of a series of movable fingers which engage the periphery of the ball and hold it until the anvil members 20 and 21 are brought up against the top and bottom of the ball. After the ball is gripped by the anvil members, the fingers are withdrawn. Any other type of ball-inserting means may be used inasmuch as such mechanism does not form a part of the present invention and many different types of such devices are known in the art.

The lower anvil 21 is mounted on and extends upwardly from a rigid arm or lever 24 which has an upwardly extending arm rotatably mounted on a shaft 25 which extends through the side walls of the box or housing 23. The shaft 25 also carries rotatably a plate member 26 having a forwardly projecting arm 27 which overlies the lever 24. The end of the arm 27 is provided with a set screw 28 which is extended toward the lever 24 and limits the relative movement of the lever 24 and the plate 26 in one direction. The lever 24 and the arm 27 are urged toward each other by means of a light spring 29 which is connected at its opposite ends to the pins 30 and 31 extending from adjacent ends of the lever 24 and the arm 27.

A third lever or plate member 32 of generally trapezoidal shape is fixed to the shaft 25 and is rotatable therewith by means of a crank 33 fixed to the end of the shaft 25.

The member 32 and the lever 24 are connected by means of a strong spring 34 which is hooked over the pins 35 and 36 on these levers, respectively, so that when the above described levers and members are in the position shown in Fig. 2, the lower anvil 21 is urged against the ball 17 by the forces exerted by both of the springs 29 and 34.

The lever 32 is maintained in an angular position tensioning the spring 34, as shown in Fig. 2, by means of a trigger lever 37 which is pivotally mounted on a plate 38 depending from the arm 19 on the sextant. The lever 37 is provided with a notched end portion 39 for engaging a pin 40 in the upper right-hand corner of the member 32 to retain the spring 34 under tension.

The member 26 is also provided with a notch 41 in its leading edge for receiving a pin 42 on the end of another retaining lever 43 which is also supported pivotally on the plate 38. The levers 37 and 43 are crossed and they are connected by means of a coil spring 43a tending to urge them toward the members 26 and 32, respectively.

The member 26 is further urged in a counterclockwise direction by means of a heavy tension spring 44 which is connected to the pins 45 and 46 on the arm 22 and the member 26, respectively.

In order to release the trigger lever 37, it is provided with a lateral extension 47 which is disposed below a plunger member 48 slidably mounted in the arm 19 and extending into the housing 23. The plunger member is normally urged upwardly by means of a spring 49.

The operation of the mechanism will be understood best by reference to Figs. 2, 3 and 4 of the drawings.

When the ball release mechanism is in the condition shown in Fig. 2, the ball 17 is clamped with heavy pressure between the anvils 20 and 21 by the forces exerted by the springs 29 and 34. The member 26 is retained in a position to stress the springs 29 and 44 by means of the stop pin 42 on the lever 43 and the member 32 is also retained in a position to stress the spring 34 by means of the trigger lever 37 and the stop pin 40 on the plate 32. When the ball is to be released, the plunger 48 is pushed downwardly, as shown in Fig. 3, with the result that the trigger lever 37 swings counterclockwise freeing it from the pin 40 and allowing the spring 34 to move the member 32 in a counterclockwise direction, also rotating the shaft 25 and the crank 33. As the member 32 rotates counterclockwise under the action of the spring 34, the force exerted by the spring 34 decreases to zero, at which time the ball 17 is held in position only by the force of the light spring 29 as shown in Fig. 3.

As the member 32 approaches the zero stress condition of the spring 34, an inclined camming edge 49 on the member strikes the retaining or stop pin 42 and rocks this pin out of the notch 41 thereby releasing the member 26 for counterclockwise rotation by means of the heavy spring 44. As the member 26 rocks counterclockwise relative to the lever 24, the pressure on the ball is reduced to about zero at the time the set screw 28 strikes the lever 24. Due to the action of the heavy spring 44 on the lever 24, the impact of the set screw swings the latter away from the ball with an acceleration greater than the acceleration due to gravity, as shown in Fig. 4, and continued movement of the member 34 and lever 24 by the action of the spring 44 moves the anvil 21 completely out of the path of the ball 17.

The operation of the releasing mechanism, therefore, is, first, to hold the ball 17 with a heavy retaining pressure, as shown in Fig. 2, then, at the instant of release, to relieve the ball from the heavy pressure, leaving only the light pressure exerted by the spring 29 to hold the ball lightly in position, followed almost immediately by a complete release of pressure and movement of the lower supporting anvil 21 away from the ball to permit the latter to fall vertically.

Inasmuch as the ball is not subjected to any appreciable pressure at the instant before its full release, elastic stresses are reduced to a minimum and the ball is not deflected horizontally. Thus the ball can fall in a true vertical line to give an accurate indication of the inclination of the instrument with respect to the horizontal and vertical.

The ball release mechanism can be reset to receive another ball by means of the crank 33. When the crank 33 is rotated in a clockwise direction from the position shown in Fig. 4, the member 32 is likewise rotated clockwise toward the position in which the stop pin 40 engages in the notch 39 in the trigger lever 37. As the member 32 is rotated toward the position shown in Fig. 2, its left-hand edge engages a fixed lug 50 on the member 26 and carries the member 26 also in a clockwise direction until the stop pin 42 drops in the notch 41 in the forward edge of the member 26. The pin 40 also engages in the notch 39 of the trigger lever 37, at about the same time as the pin 42 drops into the notch 41, thereby resetting the entire mechanism for another releasing operation.

It will be understood that the above-described release mechanism makes possible the exactly vertical release and fall of the ball 17 even though the anvils 20 and 21 are inclined substantially with respect to vertical or the face of the anvil 20 may not be precisely horizontal.

It will be understood further that the device may be modified in its details of construction, that the shape and size of the various elements may be modified as desired and that other releasing mechanisms than the plunger 48 and other resetting mechanisms than the crank 33 may be substituted, if des'red. Therefore, the form of the invention described herein should be considered as illustrative and not as limiting the scope of the following claims.

I claim:

1. A ball release mechanism for determining the position of an instrument with respect to vertical and horizontal planes comprising an upper fixed clamping member, a lower movable clamping member, first means urging said lower clamping member toward said upper member to engage and clamp a ball between them with heavy retaining pressure, second means movable to relieve said ball of substantially all pressure, and third means responsive to movement of said second means to move said lower anvil member away from said ball with an acceleration greater than that due to gravity after said ball has been relieved of substantially all pressure.

2. A ball release mechanism for determining the position of an instrument with respect to horizontal and vertical planes, comprising an upper fixed clamping member, a lower movable clamping member, means supporting said lower clamping member for swinging movement toward and away from said upper clamping member, first biasing means for urging said lower clamping member toward said upper clamping member with a strong force to engage and retain a ball between said clamping members, second biasing means to swing said lower clamping member away from said upper clamping member with an acceleration greater than that due to gravity, and means for actuating said first and second biasing means, in succession, to reduce the biasing force of said first means almost to zero, and thereafter simultaneously render it completely ineffective and said second biasing means effective.

3. A ball release mechanism for determining the position of an instrument with respect to vertical and horizontal planes, comprising an upper fixed clamping member, and a lower clamping member, said clamping members having plane surfaces to engage the top and bottom of a ball, means supporting said lower clamping member for swinging movement toward and away from said upper clamping member, first means for urging said lower clamping member toward said upper clamping member with light pressure, second means for moving said lower clamping member toward said upper clamping member with greater force, third means for swinging said lower clamping member away from said upper clamping member with an acceleration greater than that due to gravity, and means for actuating said first, second and third means to successively render said second ineffective, said first means ineffective and said third means effective.

4. A ball release mechanism comprising a fixed upper anvil member having a lower, substantially plane clamping surface, a pivoted arm adjacent to said upper anvil member, a lower anvil member extending upwardly from said arm and having an upper, substantially plane clamping surface movable with said arm into and out of alignment with said upper anvil member, a first rockable member, means resiliently connecting said rockable member to said arm for exerting a light stress on said arm urging said lower anvil member toward said upper anvil member in one position of said member, means on said rockable member engageable with said arm to move the lower anvil member out of alignment with said upper anvil member when said rockable member moves toward another position, means urging said rockable member toward said another position, means for releasably retaining said rockable member in said one position to clamp a ball lightly between said clamping surfaces, a movable member, means resiliently connecting the latter to said arm for exerting a more powerful stress on said arm to clamp said ball when the movable member is in one position and to relieve said stress when the movable member is in another position, means releasably retaining said movable member in said one position, and means for releasing successively said movable member and said rockable member for movement toward their respective another positions.

5. A ball release mechanism comprising a fixed upper anvil member having a lower, substantially plane clamping surface, a pivoted arm adjacent to said upper anvil member, a lower anvil member extending upwardly from said arm and having an upper, substantially plane clamping surface movable with said arm into and out of alignment with said upper anvil member, a first rockable member, means resiliently connecting said rockable member to said arm for exerting a light stress on said arm urging said lower anvil member toward said upper anvil member in one position of said member, means on said rockable member engageable with said arm to move the lower anvil member out of alignment with said upper anvil member when said rockable member moves toward another position, means urging said rockable member toward said another position, means for releasably retaining said rockable member in said one position to clamp a ball lightly between said clamping surfaces, a movable member, means resiliently connecting the latter to said arm for exerting a more powerful stress on said arm to clamp said ball when the movable member is in one position and to relieve said stress when the movable member is in another position, a trigger means for releasably retaining said movable member in said one position, and means on said movable member for actuating said releasable means as said movable member moves to its another position to release said rockable member for movement to its another position.

6. A ball release mechanism comprising a fixed upper anvil and a lower anvil movable toward said upper anvil to clamp a ball therebetween and away from said upper anvil to release said ball for vertical fall, resilient means to be tensioned to clamp said ball between said lower anvil and said upper anvil with strong pressure, separate resiliently urged means exerting a light pressure on said lower anvil, in one position, to clamp said ball and movable therefrom to move said lower anvil away from said upper anvil to release said ball for free vertical falling movement, and means for relieving said resilient means of tension to reduce the clamping pressure on said ball substantially to zero and thereafter moving said separate resiliently urged means from said one position.

7. A ball release mechanism comprising a fixed upper anvil and a lower anvil movable toward said upper anvil to clamp a ball therebetween and away from said upper anvil to release said ball for vertical fall, resilient means urging said lower anvil toward said upper anvil with strong pressure, and separate resiliently urged means for reducing said pressure to substantially zero, without substantially moving said lower anvil, and immediately thereafter moving said lower anvil away from said upper anvil to release said ball.

8. A ball release mechanism comprising a fixed upper anvil, a lower anvil, an arm supporting said lower anvil for movement toward said upper anvil to clamp a ball thereagainst, and away from said upper anvil to release said ball for vertical free falling movement, a pivotally mounted member adjacent to said arm, a light spring connecting said arm to said member, a releasable catch for holding said member in a position to stress said spring and urge said lower anvil toward said upper anvil, a powerful spring urging said member in a direction to relieve said light spring of stress, means on said member movable into engagement with said arm to move said lower anvil away from said upper anvil as said powerful spring moves said member, a second pivoted member, a spring connecting said arm to said second member, said second member being movable between a first position stressing the last-mentioned spring to urge said lower anvil toward said upper anvil and another position relieving the last-mentioned spring of stress, means releasably retaining said second member in said first position, and means on said second member movable to release said catch upon movement of said second member from said first position to said another position.

9. A ball release mechanism for determining the position of an instrument with respect to vertical and horizontal planes, comprising an upper fixed clamping member, a lower clamping member, said clamping members being engageable with the top and bottom of a ball to retain it therebetween, means supporting said lower clamping member for swinging movement toward and away from said upper clamping member, biasing means connected to said lower clamping member to urge it toward said upper clamping member with strong pressure, movable means for swinging said lower clamping member away from said upper clamping member with an acceleration greater than that due to gravity, and means for actuating said biasing means and said movable means to successively render said biasing means ineffective and said movable means effective.

10. A ball release mechanism for determining the position of an instrument with respect to vertical and horizontal planes, comprising an upper fixed clamping member, and a lower clamping member, said clamping members being engageable with the top and bottom of a ball, means supporting said lower clamping member for swinging movement toward and away from said upper clamping member, a member movable relative to said lower clamping member, resilient means connecting said lower clamping member and said movable member, said movable member, in one position, tensioning said resilient means to urge said lower clamping member toward said upper anvil to clamp a ball therebetween with strong pressure and, in another position, substantially freeing said resilient means from tension to relieve said ball of substantially all clamping pressure, and means responsive to movement of said movable member to said another position to swing said lower clamping member away from said upper clamping member with an acceleration greater than that due to gravity.

JOHN LIONEL RAWLINGS.

REFERENCES CITED

The following references are of record in the file of this patent:

UNITED STATES PATENTS

| Number | Name | Date |
|---|---|---|
| 873,176 | Schlieder | Dec. 10, 1907 |
| 1,944,499 | Crimp | Jan. 23, 1934 |
| 2,411,425 | Hagner | Nov. 19, 1946 |